United States Patent
Chan et al.

(10) Patent No.: US 6,298,417 B1
(45) Date of Patent: Oct. 2, 2001

(54) PIPELINED CACHE MEMORY DEALLOCATION AND STOREBACK

(75) Inventors: Kin Shing Chan, Austin; Dwain Alan Hicks, Pflugerville; Michael John Mayfield; Shih-Hsiung Stephen Tung, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/196,906

(22) Filed: Nov. 20, 1998

(51) Int. Cl.$^7$ .................................................. G06F 12/00
(52) U.S. Cl. ...................... 711/143; 711/118; 711/133; 711/140; 711/159
(58) Field of Search ................................... 711/133, 134, 711/135, 150, 159, 154, 160, 165, 141, 100, 118, 140, 143

(56) References Cited

U.S. PATENT DOCUMENTS

| | | | |
|---|---|---|---|
| 5,526,508 | * 6/1996 | Park et al. ............................ | 711/140 |
| 5,765,196 | * 6/1998 | Liencres et al. ..................... | 711/143 |
| 5,893,151 | * 4/1999 | Merchant ............................. | 711/140 |

* cited by examiner

Primary Examiner—Tuan V. Thai (74) Attorney, Agent, or Firm—Joseph P. Lally; Anthony V. S. England (57) ABSTRACT

A deallocation pipelining circuit for use in a cache memory subsystem. The pipelining circuit is configured to initiate a storeback buffer (SBB) transfer of first line data stored in a first line of a cache memory array if the deallocation pipelining circuit detects a cache miss signal corresponding to the first line and identifies the first line data as modified data. The deallocation pipelining circuit is configured to issue a storeback request signal to a bus interface unit after the completion of the SBB transfer. The circuit initiates a bus interface unit transfer of the first line data after receiving a data acknowledge signal from the bus interface unit. The pipelining circuit is still further configured to deallocate the first line of the cache memory after receiving a request acknowledge signal from the bus interface unit. This deallocation of the first line of the cache memory occurs regardless of a completion status of the bus interface unit transfer whereby a pending fill of the first cache line may proceed prior to completion of the bus interface unit transfer. In one embodiment, the storeback buffer includes first and second segments for storing first and second segment data respectively. In this embodiment, the deallocation pipelining circuit is able to detect the completion of the transfer of the first segment data during the bus interface unit transfer and preferably configured to initiate an SBB transfer of second line data from a second line in the cache memory array in response to the completion of the first segment data transfer. In this manner, the initiation of the second line SBB transfer precedes the completion of the first line bus interface unit transfer.

16 Claims, 4 Drawing Sheets

PIPELINED CACHE MEMORY DEALLOCATION AND STOREBACK

BACKGROUND

1. Field of the Present Invention

The present invention generally relates to cache memory systems and more particularly to method and circuit for reducing latencies associated with copyback transactions in cache memory subsystems that employ multiple byte cache lines.

2. History of Related Art

Microprocessor based computer systems are typically implemented with a hierarchy of memory subsystems designed to provide an appropriate balance between the relatively high cost of fast memory subsystems and the relatively low speed of economical subsystems. Typically, the fastest memory subsystem associated with a computer system is also the smallest and most expensive. Because the hit rate of any given cache memory subsystem is a function of the size of the subsystem, the smallest and fastest memory subsystems typically have the highest miss rate. To achieve optimal performance, many computer systems implement a copyback policy in which data written by the system's microprocessor is initially stored in the cache. The cache data is then typically written back to system memory at a later time by a memory control unit. In this manner, the number of time consuming accesses to system memory that must be made by the processor is greatly reduced. The performance enhancement achieved by a copyback cache policy comes at the cost of increased bus bandwidth required to maintain cache/system memory coherency. In addition, microprocessors are increasingly utilized in multi-tasking systems to carry out processor intensive applications that result in unprecedented cache traffic and the generation of relatively frequent cache miss transactions. Thus, performance problems arising from multiple pending cache miss events are becoming increasingly more common.

A cache miss occurs when a bus master such as the microprocessor is required to read information from or write information to a location in system memory that is not presently reproduced in the cache memory subsystem. Cache miss transactions in copyback cache architectures can have a greater latency due to the system overhead required to transfer the contents of the cache subsystem associated with the cache miss event to system memory prior to completing the pending transaction. This overhead can increase as the line size of the cache memory subsystem increases because more clock cycles will be required to fully transfer the contents of a dirty or modified cache line to an appropriate storage location before filling the cache line with the data associated with the cache miss. Unfortunately, long cache lines are frequently encountered to reduce the circuitry required to implement a cache tag RAM to take advantage of the memory reference locality and to take advantage of special multiple byte transfer cycles such as burst write and burst read cycles designed into many modern memory devices. Accordingly, it would be advantageous to provide a method and circuit to improve the efficiency with which multiple pending cache miss transactions are handled in a copyback cache architecture.

SUMMARY OF THE INVENTION

The problems identified above are in large part addressed by a deallocation pipelining circuit for use with cache memory systems incorporating multiple byte cache lines. By pipelining the transfer of modified cache data to a storeback buffer and by pipelining the transfer from the storeback buffer to a bus interface unit, the present invention introduces an efficient and practical circuit and method for reducing latency caused by multiple cycle storeback transactions.

Broadly speaking, the present invention contemplates a method of deallocating a cache memory line. In a first line transfer, first line data is copied from a first line of the cache to a buffer, such as a storeback buffer, in response to a cache miss that initiates a deallocation of the first line. The first line data is then copied, in a first storeback transfer that is responsive to the first line transfer, from the buffer to backing memory, such as a system memory or a higher level cache. In response to the first storeback transfer, the first cache line is deallocated before the first storeback transfer completes. In this manner, a pending fill of the first line begins before the first line data is fully transferred to the backing memory.

Preferably, the cache miss initiates the deallocation of a cache line corresponding to the cache miss if the corresponding cache line includes modified data, which is preferably indicated by at least one status bit corresponding to the cache line. In one embodiment, the storeback transfer includes an interim transfer to a bus interface unit where the storeback data resides until the bus interface unit transfers the data to the backing memory. This embodiment may be suitably implemented by issuing a storeback request signal to the bus interface unit as part of first storeback transfer. In one embodiment, the first storeback transfer further includes the bus interface unit sending a data acknowledge signal and a request acknowledge signal responsive to the storeback request.

In one embodiment, the storeback buffer includes first and second segments. In this embodiment, the first storeback transfer includes a first portion during which the first segment is copied to and a second portion during which the second segment is copied. The first portion may precede or follow the second portion. Data from a second line in the cache is then copied during a second line transfer. This second line transfer is responsive to the earlier portion of the first storeback transfer completing. In this manner, the second line transfer begins before the first storeback transfer completes thereby reducing latency that results from waiting for the entire storeback transfer to complete.

The present invention further contemplates a deallocation pipelining circuit of a cache memory subsystem. The deallocation pipelining circuit is configured to initiate copying of first line data stored in a first cache line of a cache memory array to a buffer during a first line transfer. The first line transfer is suitably responsive to a cache miss that initiates a deallocation of the first line. The circuit is further configured to initiate the copying of the first line data from the buffer to a backing memory in a first storeback transfer that is responsive to the first line transfer. The circuit is configured to deallocate the first cache line in response to the first storeback transfer, such that a pending fill of the first cache line may begin before the first storeback transfer completes.

In one embodiment, the circuit is configured to detect the cache miss and a modification status of the first line. In this embodiment, the circuits is preferably configured to initiate the first line transfer if the cache miss corresponds to the first line and the first line is modified. In one embodiment, the circuit is configured to issue a storeback request signal to a bus interface unit in response to the first line transfer, receive a data acknowledge signal from the bus interface unit in response to the storeback request signal, and initiate the first storeback transfer in to the data acknowledge signal. In one embodiment, the circuit may be further configured to receive a request acknowledge signal from the bus interface unit initiating the deallocation of the first line.

The buffer might suitably include first and second (or more) segments and the first storeback transfer might suitably including a first portion copying the first segment and a second portion copying the second segment. The first portion may either precede or follow the second portion. In such an embodiment, the circuit is preferably configured to initiate a second line transfer comprised of copying data from a second cache line to the buffer in response to the earlier portion of the first storeback transfer completing. Accordingly, the second line transfer may begin before the second portion of the first storeback transfer completes. This embodiment is suitably implemented wherein the deallocation pipelining circuit is configured to receive a segment complete signal that indicates the completion of the earlier portion of the storeback transfer and the initiation of the second line transfer is responsive to this segment complete signal.

The present invention still further contemplates a cache memory subsystem including a cache memory array, a storeback buffer and a deallocation pipelining circuit. The cache memory array suitably includes a plurality of cache lines. The storeback buffer is coupled to the cache memory array and adapted for storing a line of data from the cache memory array. The deallocation pipelining circuit is configured to initiate copying, in a first line transfer, of first line data stored in a first cache line of the cache memory array to the storeback buffer in response to a cache miss initiating deallocation of the first line. The pipelining circuit is further configured to initiate copying, in a first storeback transfer, of the first line data from the storeback buffer to a backing memory, such as the system memory or a higher level cache in response to the first line transfer. The pipelining circuit is still further configured to initiate deallocation of the first cache line in response to the first storeback transfer thus permitting the initiation of a pending fill of the first cache line to begin before the first storeback transfer completes.

Preferably, the storeback buffer of the cache subsystem includes first and second segments. In such an embodiment, the first storeback transfer includes a first portion copying the first segment and a second portion copying the second segment either of which portion may precede the other. The deallocation pipelining circuit is further configured to copy, in a second line transfer, second line data from a second cache line to the storeback buffer in response to the earlier portion of the first storeback transfer completing such that the second line transfer begins before the second portion of the first storeback transfer completes. In alternative embodiments, the cache memory subsystem comprises an L1 cache or a higher level cache.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Figure 1:
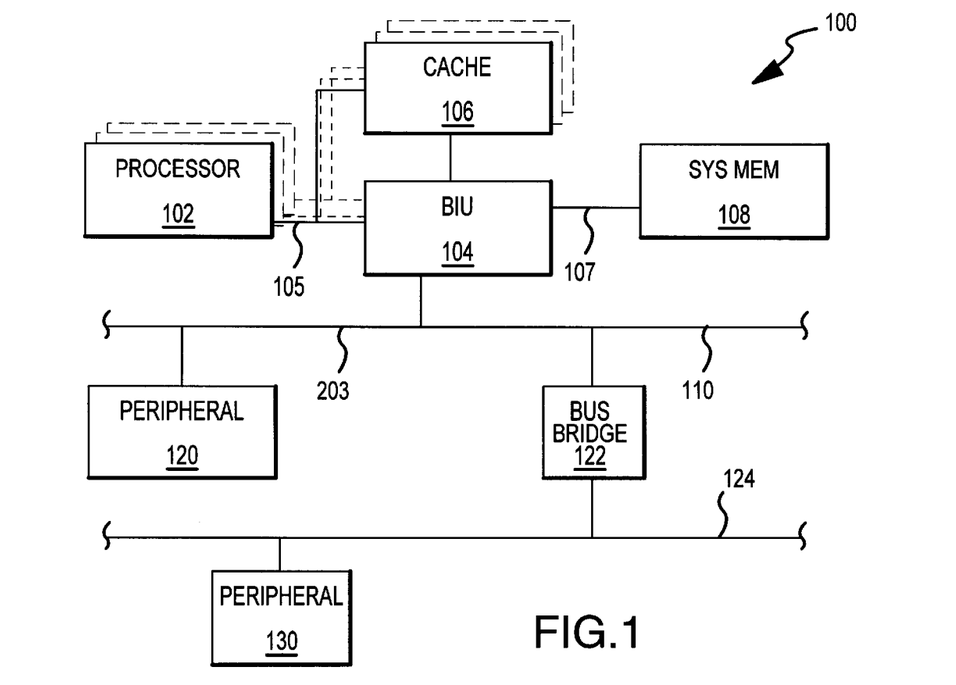
FIG. 1 is a simplified block diagram of a computer system including a cache memory subsystem according to the present invention.

Turning now to the drawings, FIG. 1 is a simplified block diagram of a computer system 100 incorporating a cache memory subsystem 106 according to the present invention. Computer system 100 includes a processing unit 102 that is coupled to a bus interface unit 104 and a cache memory subsystem 106 over a processor bus 105. The processor bus 105 conveys data, address, and control signal information between processing unit 102, bus interface unit 104, and cache memory subsystem 106. In the preferred embodiment, processing unit 102 is a microprocessor suitable for use in a variety of computer systems such as a desktop personal computer, a laptop computer, or any of a variety of network servers. Computer system 100 may incorporate a single processing unit 102 or multiple processing units for higher end applications. (The additional processing units that may be incorporated into computer system unit 100 are indicated in phantom in FIG. 1.) In an embodiment of a multiprocessor system shown in FIG. 1, each additional unit 102 is associated with a corresponding cache memory 106 such that multiple cache units 106 units are shown in phantom on FIG. 1 as well.

Computer system 100 further includes a system memory 108 connected to bus interface unit 104 over a memory bus 107. In a suitable embodiment, system memory 108 incorporates relatively large array of low cost, high density memory devices such as array of dynamic RAMs. As appreciated by those familiar with microprocessor system architecture, a memory subsystem such as cache memory subsystem 106 is typically incorporated into a computer system 100 to provide a relatively fast but relatively small memory array for storing a small portion of the information contained in system memory 108. The benefits of utilizing a cache memory such as cache memory subsystem 106 arise in part from the tendency of computer software to access memory locations that have been previously and recently accessed. In other words, it is highly probable that a memory location accessed by processing unit 102 has been previously accessed. Under these circumstances, the provision of a high speed localized memory beneficially improves the performance of processing unit 102 by reducing the number of cycles during which processing unit 102 must obtain information directly from the relatively slow system memory 108. Typically, cache memory subsystems such as cache memory subsystem 106 are implemented with relatively expensive and small arrays of high speed memories such as an array of static RAM devices. Those familiar with microprocessor architecture will appreciate that memory systems are typically arranged in a hierarchy of systems typically arranged from the smallest, fastest, and most expensive memory system (referred to for purposes of this disclosure as the L1 cache) to the slowest, largest, and least expensive memory system. In one embodiment, the cache memory subsystem 106 is integrated into a single device with processing unit 102 and comprises the L1 cache of the processing unit 102. In a not uncommon arrangement, an L1 cache system is integrated into processing unit 102, while an external, larger, and somewhat slower cache memory known as an L2 cache is provided between system memory 108, which is comprised of an array of DRAM's as described previously. The embodiment shown in FIG. 1 is intended to encompass embodiments in which cache memory subsystem 106 comprises the L1 cache of processor 102 as well as systems in which cache memory subsystem 106 comprises an L2 or higher level cache in embodiments of the present invention incorporating additional cache levels between processing unit 102 and system memory 108.

Computer system 100 typically further includes a first peripheral bus 110 connected to a peripheral port of bus interface unit 104. First peripheral bus 110 is suitably designed in accordance with an industry standard protocol such as the PCI, ISA, or EISA bus protocols to connect with peripheral devices such as peripheral device 120. Peripheral device 120 may comprise, in suitable embodiments, a hard disk controller, a CD controller, a video controller, a graphics accelerator, or various other peripheral devices. A bus bridge 122 provides a path between first peripheral bus 110 and a second peripheral bus 124. A second peripheral bus is frequently incorporated into a computer system 100 to increase the flexibility of computer system 100. In one common arrangement, first peripheral bus 110 complies with the PCI protocol while second bus 124 complies with the ISA standard such that computer system 100 maybe coupled to both PCI and ISA devices.

Figure 2:
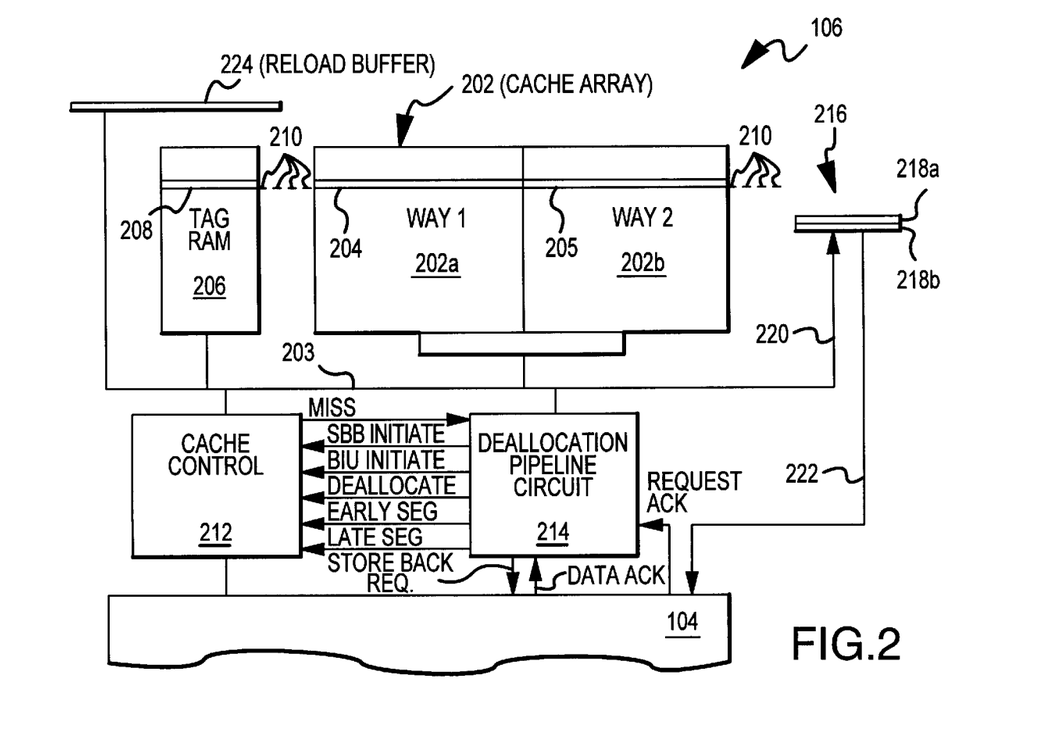
FIG. 2 is a simplified block diagram of a cache memory subsystem according to the present invention.

Turning now to FIG. 2, a simplified block diagram of cache memory system 106 is provided. Cache memory subsystem 106 includes a cache memory array 202 comprised of a plurality of cache memory cells suitable for storing digital information. As discussed previously, the preferred embodiment of cache memory 202 includes an array of static RAM memory cells. The memory cells within cache memory array 202 are suitably arranged as plurality of cache lines 204 (of which one such cache line 204 is shown in FIG. 2). Each cache line 204 includes a plurality of memory cells. Preferably, each cache line 204 is associated with at least one status bit 210 and a tag address 208. Tag address 208 is stored in a tag RAM 206 used to indicate the system memory address with which each cache line 204 is associated. As discussed previously, the contents of cache memory array 202 suitably contain a portion of the contents of a larger and slower memory system of computer system 100 such as system memory 108. Tag RAM 206 is preferably configured to provide the address information necessary to determine the system memory address of data stored in cache memory array 202. In a set associative arrangement of cache memory array 202, a first subset of the memory address (the index bit portion) is used to index tag RAM 206 while the remaining portion of the memory address (the set bit portion) is stored in or compared with the contents of the indexed tag RAM location. In this manner, each system memory address is associated with a particular subset of cache memory array 202 and may reside in any location in that subset. A cache miss occurs when the set bit portion of a memory address differs from the contents of the location within tag RAM 206 indicated by the system memory address index bits. A cache miss indicates that the contents of the system memory address under consideration are not currently stored in the cache. Thus, in a set associative cache, a miss event is associated with multiple cache lines selected by the index bits of the system memory address. As an example, a system memory address of 1234 5678h might be comprised of index bits 678h and set bits 12345h. If the contents of the 678h$^{th}$ tag RAM location location differ from 12345h, a cache miss has occurred and the cache miss is associated with the cache line corresponding to the 678h$^{th}$ tag RAM location.

In the preferred embodiment, at least one status bit 210 is associated with each cache line 204 to provide modification information about the corresponding cache line 204. In one well known embodiment, four status bits per cache line are provided and maintained according to the MESI protocol. Regardless of the particular embodiment chosen to implement status information concerning cache line 204, the preferred embodiment of the present invention contemplates at least one status bit 210 for providing modification information about cache line 204. A cache line 204 is modified if the data stored in the cache differs from the data stored in the corresponding system memory location. A cache line can become modified if the cache policy permits processor write cycles to modify data in the cache without simultaneously modifying the data in the corresponding system memory location. Permitting modification of the cache memory array 202 without simultaneously updating the contents of system memory 108 introduces incoherencies between cache memory and system memory and necessitates coherency verification circuitry, but beneficially improves system performance by minimizing or potentially delaying time consuming accesses to system memory 108. If, for example, cache memory subsystem 106 implements a copyback policy and processor unit 102 executes a write command that results in a hit to cache line 204, the line is updated with the write data and the modification information conveyed by status bits 210 is updated to indicate that cache line 204 contains modified data. If a cache line 204 is selected for replacement and then a cache miss corresponding to cache line 204 occurs during a subsequent command (either read or write), it will be appreciated by those familiar with cache memory systems that the contents of the modified cache line must be transferred to the system memory 108 before the command that resulted in the cache miss can be executed.

Cache memory array 202, in the embodiment depicted in FIG. 2, is a two-way set associative cache. The two-way cache is divided into a first way 202a and a second way 202b. In a two-way set associative cache, a given set of system memory address index bits corresponds to two cache lines, one in first way 202a and a another in second way 202b. Typically, an arbitration scheme is implemented in a multiple way cache to determine which of the two or more ways will be selected for replacement during any given cache miss cycle. Although the embodiment of cache memory array 202 depicted in FIG. 2 is a two-way cache, it will be readily appreciated that the present invention is not limited to any particular configuration of cache memory array 202. In other words, one way, four way, eight way, etc. set associative cache arrays maybe suitably used in the present invention.

A cache miss occurs when processing unit 102 issues an instruction with a system memory address that is not currently reproduced in cache memory subsystem 106. When a miss corresponds to a modified cache, it is necessary to copy the data stored in the cache line to system memory 108 prior to re-writing the cache line with the information required by the cache miss cycle. The copyback process may unnecessarily and undesirably hamper system performance by consuming multiple clock cycles, especially if the cache line size is large relative to cache bus 203. Despite some disadvantages that accompany them, large cache lines are frequently preferred when implementing cache memory arrays to reduce the amount of circuitry required to implement cache tag RAM 206. A copyback of a modified cache line is typically accomplished by copying the line to a buffer or temporary storage location referred to for purposes of this disclosure as a storeback buffer. Accordingly, a preferred embodiment of cache memory subsystem 106 includes a storeback buffer 216 that is configured or suitable for storing a line of information from cache memory array 202. Information stored in storeback buffer 216 is eventually routed to and ultimately stored in a backing memory such as system memory 108 or in a higher level cache of computer system 100. In the embodiment depicted in FIG. 2, the data is routed to backing memory via a bus interface unit 104 that performs various interfacing functions between the system processor, system memory, and peripheral devices or bus master coupled to the peripheral bus or busses. Among these functions, bus interface unit is typically responsible for "snooping" memory address locations issued by bus masters on the peripheral bus or busses to maintain coherency between system memory and the cache.

In conventional systems, it was typically necessary for information in storeback buffer 216 to be completely transferred to bus interface unit 104 before first cache line 204 of cache memory array 202 could be released or deallocated. Deallocation refers to the process by which a previously used cache line is made available for a pending or subsequent cache event. If a pending cache transaction requires deallocation of a particular cache line before the cache event may precede, computer system 100 may be undesirably forced to execute one or more no op cycles while waiting for the storeback operation to complete. The present invention contemplates a minimization or reduction in performance penalty caused by system delays associated with storeback transactions.

More particularly, cache memory subsystem 106 includes a deallocation pipelining circuit 214. Deallocation pipelining circuit 214 is configured to initiate copying, in a first transfer (referred for purposes of this disclosure as a line transfer), of first line data stored in first cache line 204 of cache memory array 202 to a buffer such as storeback buffer 216 in response to a cache miss that initiates a deallocation of first cache line 204. Preferably, deallocation pipelining circuit 214 detects a cache miss corresponding to first cache line 204 and determines whether the first cache line 204 contains modified data. If first cache line 204 contains modified data, deallocation pipelining circuit 214 initiates a copying of cache line 204 to storeback buffer 216.

In the preferred embodiment, the data is transferred from cache line 204 to storeback buffer 216 over a storeback bus 220. As depicted in FIG. 2, the components of cache memory subsystem 106 communicate over a cache bus 203 which conveys data, address, and control information among various components of subsystem 106. A cache control unit 212 controls tag RAM 206, cache memory array 202, and status bits 210. In the depicted embodiment, a miss signal is generated by control unit 212 each time a cache miss occurs. The miss signal is sent to deallocation pipelining circuit 214. In the preferred embodiment, pipelining circuit 214 detects the cache miss signal and determines whether the cache line associated with the cache miss contains modified data. In the preferred embodiment, the pipelining circuit 214 verifies the modification status of the cache line 204 by inspecting its corresponding status bits 210. If a cache miss corresponds to a cache line 204 that includes modified data as indicated by its status bit 210, deallocation pipelining circuit 214 preferably sends a storeback buffer transfer initiation signal to control unit 212 to initiate a transfer of the contents of the cache line 204 to storeback buffer 216. In the depicted embodiment, a storeback bus 220 conveys the data transfer transferred from cache line 204 to storeback buffer 216. In one exemplary embodiment, each cache line within cache memory array 202 includes 128 bytes and the width of storeback bus 220 is 64 bytes. In such an embodiment, the transfer of the contents of the first cache line 204 to storeback buffer 216 requires two clock cycles.

Upon completing the first line transfer, pipelining circuit 214 initiates copying, in a transfer referred to as a storeback transfer, the data in storeback buffer 216 to a backing memory such as system memory 108 or a higher level cache. In the preferred embodiment, the data is transferred to backing memory via an interim storage location such as bus interface unit 204. In one embodiment, deallocation pipelining circuit 214 initiates this first storeback transfer by issuing a storeback request to bus interface unit 104 over a storeback request signal line indicated in FIG. 2. The bus interface unit 104, in response to the storeback request from pipelining circuit 214 bus interface unit 104 will respond with a data acknowledge signal over the data acknowledge signal line indicated in FIG. 2. The data acknowledge signal indicates to the pipelining circuit 214 that the bus interface unit 104 has located an available buffer for storing the contents of storeback buffer 216. In response to the data acknowledge signal from bus interface unit 204, pipelining circuit 214 initiates a transfer of the first line data from storeback buffer 216 to bus interface unit 104 over bus interface unit bus 222 by generating a storeback initiation signal that directs cache control unit 212 to begin transferring the buffered data. While this storeback transfer is proceeding, bus interface unit 104 verifies that the buffered data is suitable for transmission to backing memory such as system memory 108. This verification typically involves snooping transactions occurring on peripheral bus 110 to insure that no peripheral devices are simultaneously accessing the relevant system memory address. If bus interface unit 104 verifies that the data is appropriate for storeback to backing memory, it generates a request acknowledge signal which is detected by pipelining circuit 214. The request acknowledge signal from bus interface unit 104 indicates to deallocation pipelining circuit 214 that the modified data originating from first cache line 204 is now fully committed to the bus interface unit 104. In other words, the request acknowledge signal from bus interface unit 104 signals pipelining circuit 214 that it is no longer necessary to retain the data in first cache line 204 of cache memory array 202. In the depicted embodiment, pipelining circuit 214 responds to the request acknowledge signal by initiating a deallocation signal to cache control unit 212. In response to the deallocation signal, cache control unit 212 is able to deallocate first cache line 204 before the first storeback completes. In the preferred embodiment, the deallocation of first cache line 204 is accomplished by suitably adjusting the status bits 210 of first cache line 204 to indicate that first cache line 204 no longer contains modified data. In an embodiment of the present invention in which the status bits 210 comprises four or more MESI bits, deallocation of first cache line 204 may comprise simply resetting the modification bit. Regardless of the details of the deallocation process, the deallocation of first cache line 204 enables a pending line fill to proceed. Satisfaction of a pending line fill suitably comprises transferring data from a buffer such as reload buffer 224 into first cache line 204 of cache memory array 202. Reload buffer 224 is configured to receive data from processing unit 102 during a cache miss event. If, for example, processing unit 102 executes an instruction (read or write) that results in a cache miss corresponding to a modified cache line, the data is temporarily saved in reload buffer 224 thereby permitting processing unit 102 to resume execution of pending computer instructions.

As discussed previously, the organization of cache memory array 202 is frequently divided into a plurality of multiple byte cache lines such as first cache line 204. Each cache line 204 is typically configured to include data from adjacent sequential memory locations within a system memory 108 of computer system 100. While long line sizes reduce the amount of circuitry required for tag RAM 206, they can result in system delays when the bus over which a modified cache line is written back to system memory 108 is significantly narrower than the cache line. In one embodiment, for example, the size of cache line 204 is 128 bytes while the width of storeback bus 220 is 64 bytes and the width of the bus interface unit bus 222 is 16 bytes. In this embodiment, each line transfer from cache memory array 202 to storeback buffer 216 consumes two clock cycles while each storeback transfer from storeback buffer 216 to bus interface unit 104 requires 8 cycles. If cache memory subsystem 106 is required to await the completion of the storeback transfer over the bus interface unit bus 222 before deallocating first cache line 204, it will be appreciated that significant delays will be incurred in systems employing multiple byte cache lines.

Turning our attention now to storeback buffer 216 of FIG. 2, an embodiment of the present invention contemplates a storeback buffer 216 that includes a first segment 218a and a second segment 218b. In this embodiment, the segments 218 of storeback buffer 216 are configured such that the line transfer of data from cache memory array 202 to storeback buffer 216 fills first segment 218a during a first portion of the line transfer and fills second segment 218b during a second portion of the line transfer. Similarly, the storeback transfer of data from storeback buffer 216 to backing memory via bus interface unit 104 includes a first portion comprising copying data in first segment 218a and a second portion comprising copying data in second segment 218b. The first portion may either precede or follow the second portion of the storeback transfer to accommodate embodiments in which the segment transfers are prioritized according to deliver the desired data (which may reside within either first segment 218a or second segment 218b) first. The segment that is transferred earlier in time, whether it be the first or second segment, is referred to in this disclosure as the early segment while the segment transferred later in time is the late segment. (Although not shown in the drawings, it will be appreciated that storeback buffer 216 may be further divided into three or more segments in suitable embodiments). In embodiments of the present invention employing a multi-segment storeback buffer, pipelining circuit 214 is configured to initiate copying, in a second line transfer, of second line data to storeback buffer 216 in response to completion of the early segment transfer. In the preferred embodiment, pipelining circuit 214 is configure to initiate a second line transfer cycle when pipelining circuit 214 detects that the early segment has been fully transferred to bus interface unit 104. The embodiment depicted in FIG. 2 shows an early segment signal output from pipelining circuit 214 to cache control unit 212. When pipelining circuit 214 asserts this early segment signal, cache control unit 212 initiates a second line transfer cycle (assuming a pending or buffered writeback of a second modified cache line is detected). Utilizing the early segment signal, cache memory subsystem 106 and deallocation pipelining circuit 214 may initiate a second storeback transaction before the first storeback transfer completes. For example, in an embodiment in which the ratio of the line size to the width of the bus interface unit bus 222 is 8, (i.e., eight cycles are required to transfer data in storeback buffer 216 to bus interface unit 104) storeback buffer 216 may be suitably configured into two segments 218a and 218b each with a capacity to contain a portion of a line of a cache memory array 202. In an embodiment in which each segment 218 is configured to contain half a line, it will be appreciated that four cycles minimum are required to transfer the contents of either segment to bus interface unit 104. If a storeback transfer is initiated, the early segment of storeback buffer 216 will be fully transferred to bus interface unit 104 after four clock cycles. Deallocation pipelining circuit 214 may then assert the early segment signal thereby initiating a second line transfer. The second line transfer will, therefore, begin to the early segment of storeback buffer 216 while data in late segment is being transferred to bus interface unit 104. By filling the early segment buffer with second line data before the late segment buffer comprising first line data is fully transferred to bus interface unit 104, the present invention further reduces system latency that would result if subsequent storeback request were required to await the completion of the entire storeback transfer. In one embodiment, the second line transfer will suspend if the early segment of storeback buffer 216 fills with second line data before the late segment of first line data is transferred to bus interface unit 104. Such an embodiment may be implemented by configuring pipelining circuit 214 to assert a late segment signal in a manner similar to the early segment signal, indicating when the contents of the late segment have been fully transferred to bus interface unit 104. Alternatively, in an embodiment (not explicitly depicted) comprising multiple storeback buffers 216, the second line transfer is directed to a different storeback buffer than the storeback buffer containing the first line data thereby eliminating the problem of the second line transfer overwriting first line data in storeback buffer 216 before the first line data is transferred to bus interface unit 104.

Figure 3:
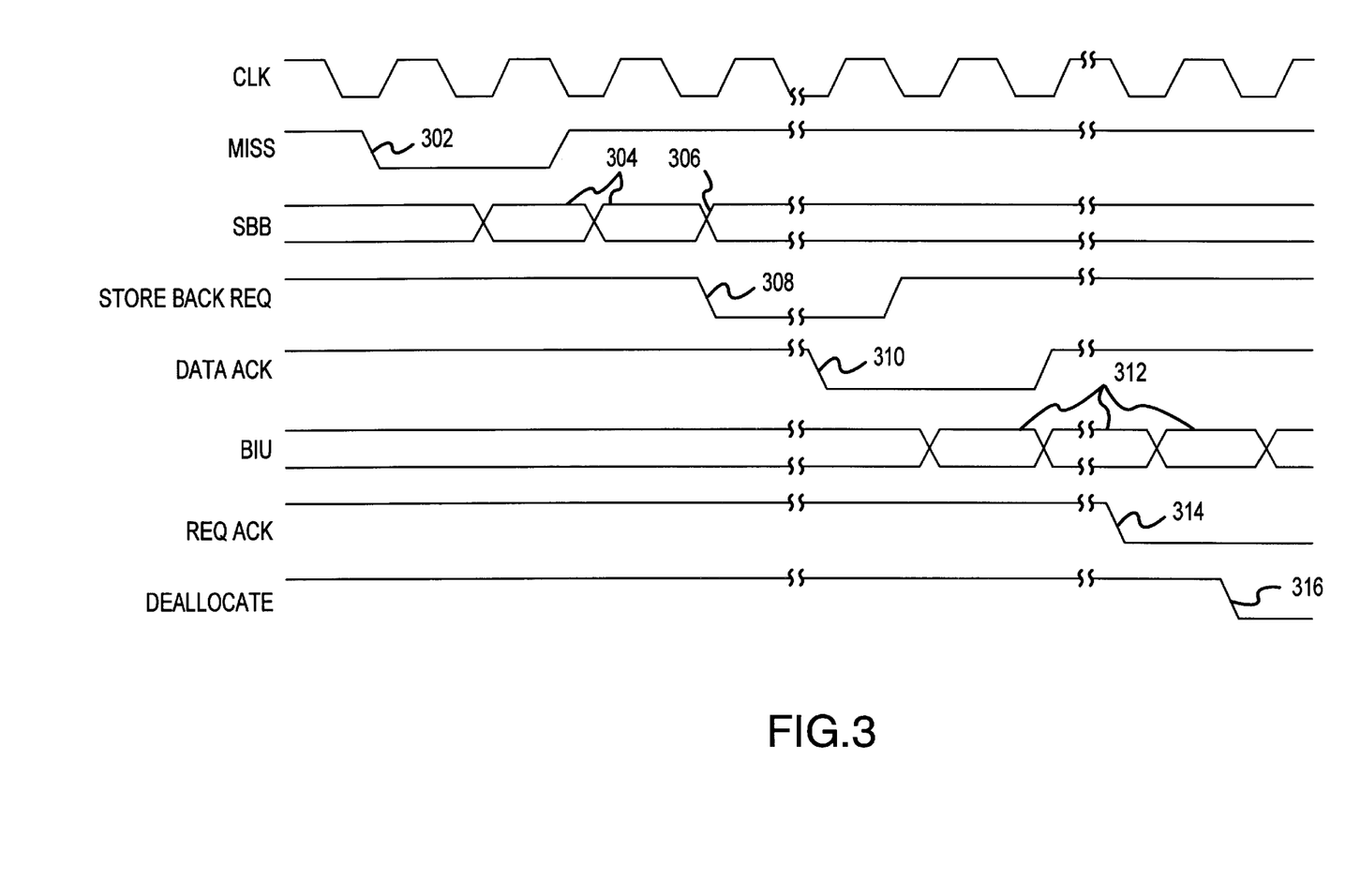
FIG. 3 is a timing diagram of selected signals in one embodiment of the present invention.
Figure 4:
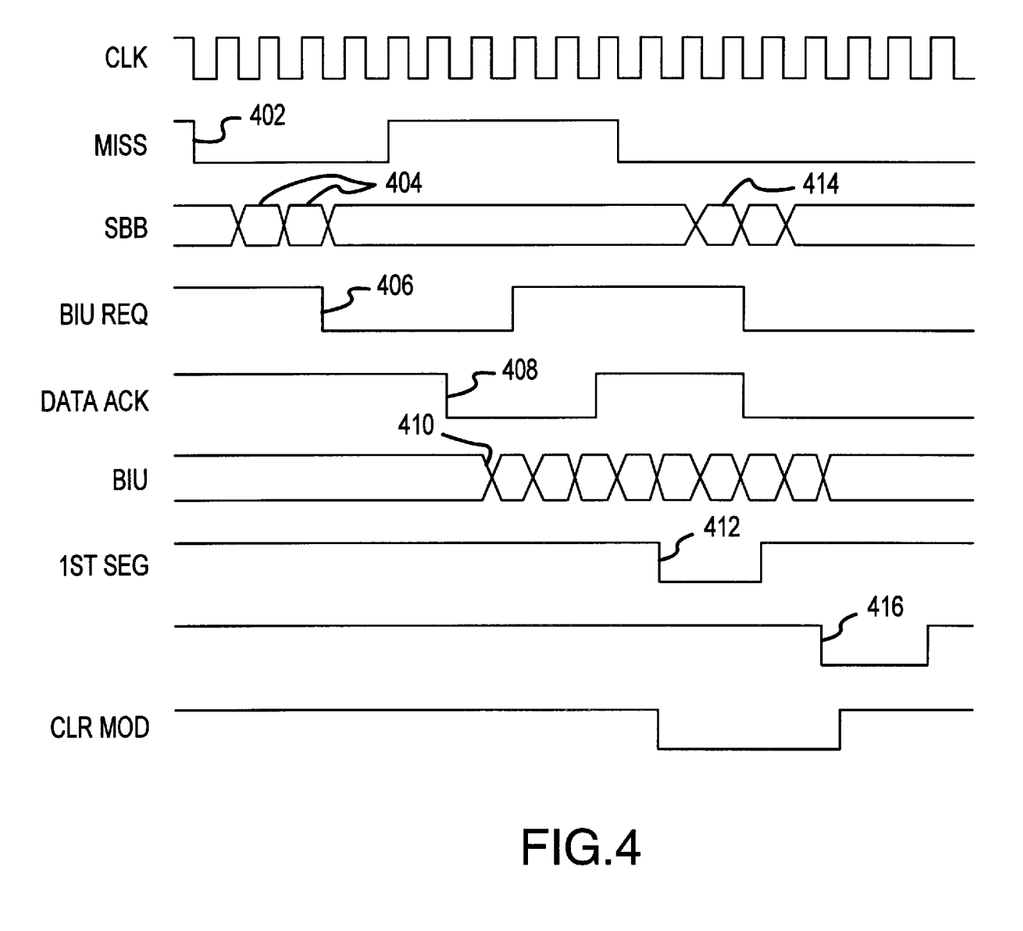
FIG. 4 is a timing diagram indicating selected signals of an embodiment of a cache memory subsystem according to the present invention.

Turning now to FIGS. 3 and 4, timing diagrams are presented to indicate the operation of the deallocation of pipelining circuit 214 depicted in conjunction with cache memory subsystem 106. In FIG. 3, the miss signal is asserted at reference numeral 302 to indicate a cache miss. In response to receiving the miss signal 302, pipelining circuit 214 determines whether the address associated with the cache miss corresponds to a cache line 204 in cache memory array 202 containing modified data. If the corresponding cache line 204 is modified, a line transfer initiate signal is generated by pipelining circuit 214. In response to the line transfer initiate signal, a line transfer begins. The line transfer is indicated in FIG. 3 by reference numeral 304 which depicts two cycles of valid addresses corresponding to an embodiment of the present invention in which the cache line size is twice as wide as storeback bus 220. Upon completion of the line transfer at reference numeral 306, a storeback request is asserted at the transition indicated by reference numeral 308. In response to the storeback request 308, bus interface unit 104 generates a data acknowledge signal indicated by reference numeral 310 when bus interface unit 104 has located an available storage location within bus interface unit 104 for receiving information from storeback buffer 216. In response to receiving the data acknowledge signal 310, pipelining circuit 214 generates a storeback transfer initiate signal which causes control unit 212 to begin transferring information from storeback buffer 216 to bus interface unit 104 over bus interface unit bus 222. This storeback transfer is indicated in FIG. 3 by the valid addresses of reference numeral 312. If bus interface unit 104 determines that it will take responsibility for the data stored in storeback buffer 216, bus interface unit 104 issues a request acknowledge signal indicated by reference numeral 314. In response to receiving the request acknowledge signal, pipelining circuit 214 generates a deallocate signal indicated by reference numeral 316. As discussed previously, the deallocation signal enables cache control unit 212 to deallocate first cache line 204 prior to the completion of the storeback transfer thereby potentially reducing wait states.

Turning now to FIG. 4, a timing diagram emphasizing the partitioning of storeback buffer 216 into segments it presented. In FIG. 4, a miss signal is generated at reference numeral 402 and a first line transfer initiated as indicated by reference numerals 404 in the manner discussed previously. Similarly, a bus interface unit request is initiated at reference numeral 406, a data acknowledge signal asserted at reference numeral 408, and a storeback transfer initiated at reference numeral 410. The particular diagram presented in FIG. 4 is illustrative of an embodiment in which the cache line size is eight times as wide as bus interface unit bus 222 and the storeback buffer is divided into two equal segments. In this embodiment, it will be appreciated that first segment 218a of storeback buffer 216 is transferred after four cycles of the storeback transfer. At this point, the first segment signal is generated by pipelining circuit 214 as indicated by reference numeral 412. In response to the assertion of the first segment signal, a second line transfer indicated by reference numeral 414 is initiated in the clock cycle subsequent to the assertion of the first segment signal. Depending upon the embodiment, suspension of the second line transfer may be required until a second segment signal 416 is asserted by pipelining circuit 214 to indicate that the contents of second segment 218b of storeback buffer 216 have been completely transferred to bus interface unit 104.

Figure 5:
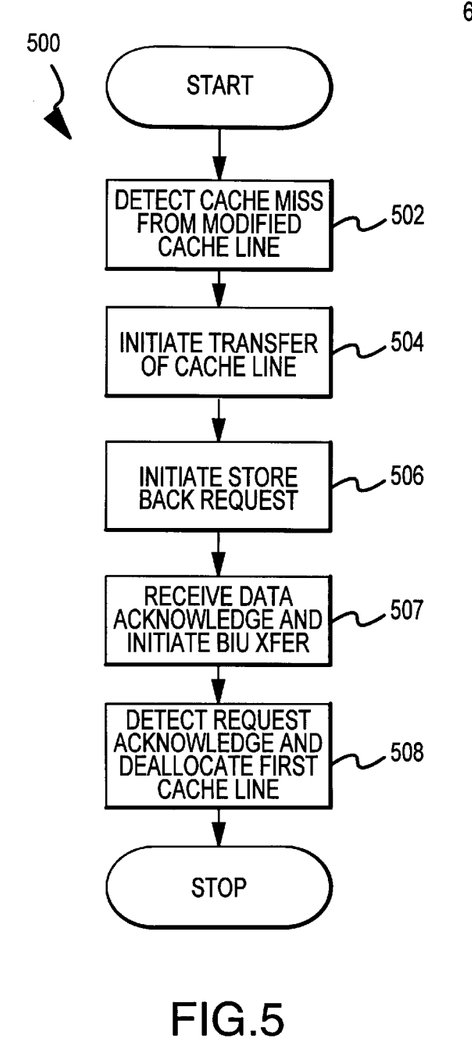
FIG. 5 is a flow diagram of a method of pipelining line deallocation in a cache memory system according to the present invention.
Figure 6:
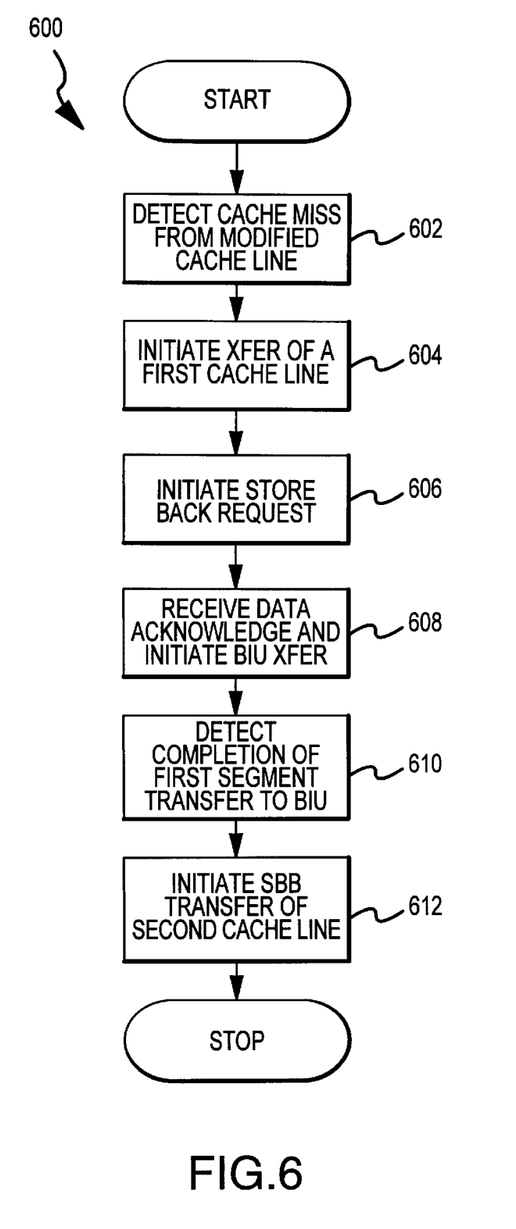
FIG. 6 is a flow diagram of an embodiment of the present invention for pipelining transfers of modified data from a cache memory array to a storeback buffer.

Turning now to FIGS. 5 and 6, flow diagrams are presented representative of methods contemplated by the present invention. In FIG. 5, a cache miss to a modified cache line is detected in step 502. In response to the miss of step 502, a line transfer of the cache line associated with the cache miss event is initiated in step 504. Upon completion of the line transfer, a storeback transfer is initiated. In the preferred embodiment, the initiation of the storeback transfer is achieved with a storeback request generated in step 506 and transmitted to a bus interface unit. After an acknowledge signal is received from the bus interface unit, a storeback transfer is initiated in step 507 to transfer the contents of the storeback buffer to the bus interface unit. When the bus interface unit accepts responsibility for the data, a request acknowledge signal is generated by the bus interface unit and detected by a deallocation pipelining circuit, which then deallocates the cache line in response to the request acknowledge signal in step 508. In this manner, the deallocation of the cache line containing the modified data occurs independently of the completion of the bus interface transfer such that system performance is improved by reducing latencies.

In FIG. 6, a method according to the invention is presented emphasizing an embodiment in which the storeback buffer includes at least two segments. In this embodiment, similar to the embodiment depicted in and discussed in reference to FIG. 5, the method begins with a cache miss that initiates a deallocation transaction in step 602. A transfer of the first cache line to the storeback buffer is initiated in step 604 and a storeback request generated in step 606. After an acknowledge signal is received from the bus interface unit, a storeback transfer of the contents of the storeback buffer to the bus interface unit begins in step 610. When the data within the first segment of the storeback buffer is transferred to the bus interface unit, a first segment signal is generated in step 610 to indicate the completion of a first portion of the first storeback transfer. In response to the signal produced in step 610, a second transfer to the storeback buffer of data associated with a second cache line is initiated in step 612. Because of the segmentation of the storeback buffer, the initiation of the second transfer to the storeback buffer can proceed as soon as the first segment of the storeback buffer has been transferred to the bus interface unit on route to backing memory. Thus, system performance is enhanced by reducing the number of cycles a pending copyback transaction will be required to wait.

It will be apparent to those skilled in the art having the benefit of this disclosure that the present invention contemplates a cost effective mechanism for reducing processor latencies caused by multiple pending cache miss events requiring storeback transactions. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of deallocating a line of a cache memory, comprising the steps of:

copying, in a first line transfer, first line data from a first line of the cache memory to a storeback buffer, the first line transfer responsive to a cache miss associated with the first line of the cache memory;

responsive to the first line transfer, requesting a first storeback transfer of the first line data from the storeback buffer to a backing memory;

acknowledging the first storeback transfer request and, responsive thereto, initiating the first storeback transfer; and upon verifying the first storeback transfer data as suitable for storing to the backing memory, deallocating the first line of the cache memory and initiating a pending fill of the first line while the first storeback transfer is completing; wherein the storeback buffer includes first and second segments and wherein the first storeback transfer includes a first portion comprising copying the first segment and a second portion comprising copying the second segment; and copying, in a second line transfer, second line data from a second cache line to the storeback buffer, the second line transfer responsive to the first portion of the storeback transfer wherein the second line transfer begins before completion of the first store back transfer.

2. The method of claim 1, wherein the cache miss initiating the deallocation comprises a cache miss corresponding to a modified cache line.

3. The method of claim 1, wherein the backing memory includes a main memory.

4. The method of claim 1, wherein the backing memory includes a higher level cache.

5. The method of claim 1, wherein verifying the first storeback data comprises snooping a peripheral bus for transactions accessing a system memory address associated with the first line.

6. The method of claim 1, wherein the first storeback transfer includes transferring via a bus interface unit.

7. The method of claim 1, wherein the first storeback transfer includes issuing a storeback request signal to a bus interface unit and receiving an acknowledge signal from the bus interface if the bus interface unit can buffer the first line data.

8. The method of claim 7, wherein the first storeback transfer includes the bus interface unit sending a data acknowledge signal responsive to the storeback request signal.

9. A deallocation pipelining circuit of a cache memory subsystem comprising:

means for copying, in a first line transfer, first line data from a first line of the cache memory to a storeback buffer, the first line transfer responsive to a cache miss initiating a deallocation of the first line of the cache memory;

means for requesting a first storeback transfer of the first line data from the storeback buffer to a backing memory responsive to the first line transfer;

means for detecting acknowledgement of the first storeback transfer request and, responsive thereto, initiating the first storeback transfer; and means for deallocating the first line of the cache memory and initiating a pending fill of the first line while the first storeback transfer is completing upon verifying the first storeback transfer data as suitable for storing to the backing memory;

wherein the storeback buffer includes first and second segments and wherein the first storeback transfer includes a first portion comprising copying the first segment and a second portion comprising copying the second segment; and copying, in a second line transfer, second line data from a second cache line to the storeback buffer, the second line transfer responsive to the first portion of the storeback transfer wherein the second line transfer begins before completion of the first store back transfer.

10. The circuit of claim 9, wherein the circuit is configured to detect the cache miss associated with the first line and a modification status of the first line and further configured to initiate the first line transfer if the cache miss corresponds to the first line and the first line is modified.

11. The circuit of claim 9, wherein the circuit is configured to issue a storeback request signal to a bus interface unit and receive a data acknowledge signal from the bus interface unit responsive to the storeback request signal, wherein the initiation of the first storeback transfer is responsive to the data acknowledge signal.

12. The circuit of claim 9, wherein the circuit is configured to receive a first segment complete signal indicative of completion of the first portion, wherein the initiation of the second line transfer is responsive to the first segment complete signal.

13. A cache memory subsystem comprising:

a cache memory array comprising a plurality of cache lines;

a storeback buffer coupled to the cache memory array and adapted for storing a line of data from the cache memory array; and a deallocation pipelining circuit configured to initiate copying, in a first line transfer, of first line data stored in a first line of cache memory to a storeback buffer, the first line transfer responsive to a cache miss initiating a deallocation of the first line of said cache memory;

wherein the deallocation pipelining circuit is further configured to initiate copying, in a first storeback transfer, of the first line data from the buffer to a backing memory in response to the first line transfer; and wherein the deallocation pipelining circuit is still further configured to deallocate the first cache line upon detecting verification of the first storeback transfer, wherein a pending fill of the first cache line begins before the first storeback transfer completes; wherein the storeback buffer includes first and second segments and wherein the first storebark transfer includes a first portion comprising copying the first segment and a second portion comprising copying the second segment, wherein the deallocation pipelining circuit is further configured to copy, in a second line transfer, second line data from a second cache line to the storeback buffer, the second line transfer responsive to the first portion of the first storeback transfer wherein the second line transfer begins before the second portion of the first storeback transfer completes.

14. The subsystem of claim 13, wherein the cache memory subsystem comprises an L1 cache.

15. The subsystem of claim 13, wherein the cache memory subsystem comprises a higher level cache.

16. The subsystem of claim 13, further comprising a reload buffer configured to store data of the pending line fill.

* * * * *

UNITED STATES PATENT AND TRADEMARK OFFICE
CERTIFICATE OF CORRECTION

| | | |
|---|---|---|
| PATENT NO. | : 6,298,417 B1 | Page 1 of 1 |
| DATED | : October 2, 2001 | |
| INVENTOR(S) | : Kin Shing Chan, Dwain Alan Hicks, Michael John Mayfield, Shih-Hsiung Stephen Tung | |

It is certified that error appears in the above-identified patent and that said Letters Patent is hereby corrected as shown below:

<u>Column 13,</u>
Line 47, claim 10 should read:
-- 10. The circuit of claim 9, further comprising means for detecting a cache miss associated with the first line and a modification status of the first line and means for initiating the first line transfer if the cache miss corresponds to the first line and the first line is modified. --

Signed and Sealed this

Ninth Day of July, 2002

*Attest:*

*Attesting Officer*

JAMES E. ROGAN
*Director of the United States Patent and Trademark Office*